No. 627,001. Patented June 13, 1899.
F. LAHM.
ROLLER ATTACHMENT FOR SLEDS.
(Application filed June 15, 1898.)
(No Model.)
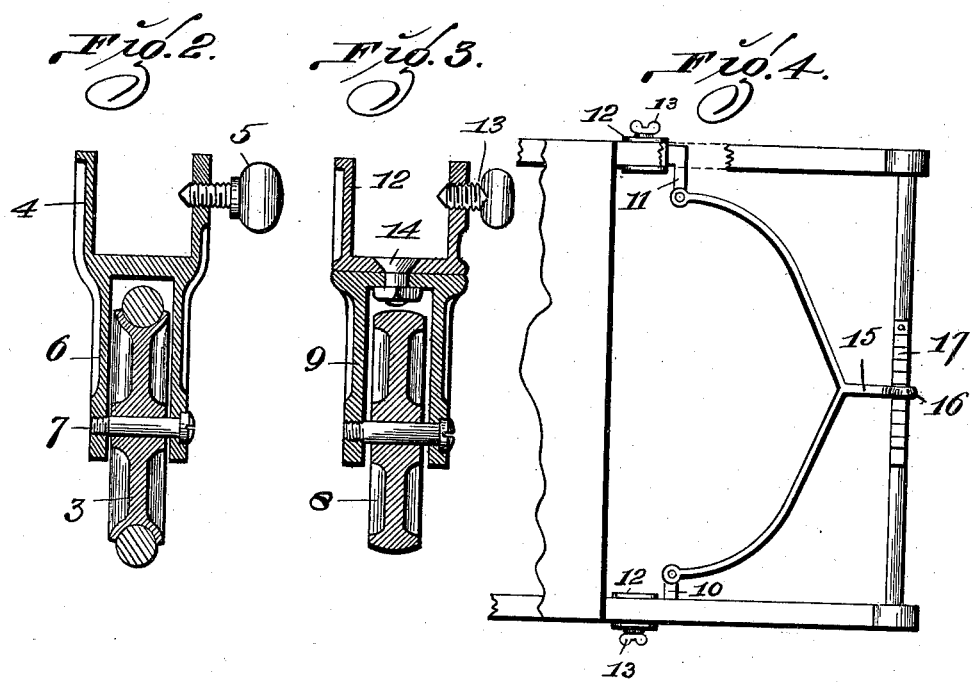
Inventor:—
Ferdinand Lahm.
By Higdon, Longan, & Higdon.
Att'ys.
Attest
M. P. Smith
A. J. McCauley

UNITED STATES PATENT OFFICE.

FERDINAND LAHM, OF ST. LOUIS, MISSOURI.

ROLLER ATTACHMENT FOR SLEDS.

SPECIFICATION forming part of Letters Patent No. 627,001, dated June 13, 1899.

Application filed June 15, 1898. Serial No. 683,541. (No model.)

*To all whom it may concern:*

Be it known that I, FERDINAND LAHM, of the city of St. Louis, State of Missouri, have invented certain new and useful Improvements in Roller Attachments for Sleds, of which the following is a full, clear, and exact description, reference being had to the accompanying drawings, forming a part hereof.

My invention relates to roller attachments for sleds; and it consists of the novel construction, combination, and arrangement of parts hereinafter shown, described, and claimed.

Figure 1 is a side elevation of a sled provided with my improved roller attachments. Fig. 2 is an enlarged vertical sectional view taken approximately on the line 2 2 of Fig. 1. Fig. 3 is an enlarged vertical sectional view taken approximately on the line 3 3 of Fig. 1. Fig. 4 is a plan view of the front portion of the sled seen in Fig. 1.

Referring by numerals to the accompanying drawings, 1 indicates the body of the sled, which may be of any suitable construction and provided with the usual runners 2. Fitted beneath the rear end of each of the runners is a small roller or wheel 3, which may be, if desired, provided with a rubber tire or face. A U-shaped clip 4 is adapted to receive the runner 2, and a set-screw 5 passes through one wall of this clip 4 and provides means whereby said clip is rigidly secured to said runner. Ears 6 are formed integral with and extend downwardly from the clip 4, through the lower ends of which ears 6 passes the screw or pin 7, upon which the roller 3 is rotatably mounted.

Arranged beneath the forward ends of the runners 2 are the rollers 8, in every way similar in size and construction to the rollers 3, previously mentioned.

In Fig. 2 the roller is illustrated with a rubber tire, while in Fig. 3 the roller is shown without any auxiliary tire. The front pair of rollers 8 are arranged for rotation between the inverted-U-shaped clips 9, which clips are provided with the integral forwardly-extending arms 10, the forward ends of which arms 10 terminate in the inwardly-bent ends 11. U-shaped clips 12 are provided with the set-screws 13, whereby said clips are rigidly fixed upon the runners 2, and the clips 9 and 12 are pivoted together at their centers by means of a bolt or screw 14 passing through the meeting portions of said clips.

A steering device comprises an arm 15, on the end of which is formed an integral hook 16, the rear end of said arm 15 being bifurcated and the arms formed by this bifurcation curving rearwardly and downwardly and being fastened to the inner portions of the ends 11 of the arms 10. A rack 17 is located upon a rod that extends between the forward ends of the runners 2 of the sled, and the hook 16 is adapted to engage between the notches of said rack. When this hook 16 is in the center one of the notches, as shown in Fig. 4, the front rollers 8 are parallel with the runners 2 and with the rear rollers 3. Therefore the sled will advance in a straight line. Should the hook 16 be disengaged from the center one of the notches and moved laterally to any one of the remaining notches, the front rollers 8 will be necessarily turned in the direction in which said hook 16 is moved and the sled will advance in this direction.

Any ordinary sled may be provided with my improved rollers and when so provided is adapted to be used upon smooth sidewalks, pavement, or upon a floor. Where a sled is fitted with the rollers and is to be used in a house, it is desirable that said rollers be provided with the rubber tires, as shown in Fig. 2, as this construction will not mar the floor or injure the carpet in any way.

By the use of my improved attachments the sport and amusement incident to the use of a sled during the winter time may be indulged in during all the seasons, and said attachments are very easily manipulated, simple, and readily applied to or removed from the runners of the sled.

I claim—

An attachment for sleds, constructed with clips adapted to fit the lower edge of the sled-runners, means whereby said clips are rigidly fixed to said runners, inverted-U-shaped clips pivotally connected to the first-mentioned clips, rollers rotatably carried between said inverted clips, rectangularly-bent arms formed integral with the forward ends of the inverted-U-shaped clips and a bifurcated steering-rod having its ends secured to said rectangularly-bent arms, substantially as specified.

In testimony whereof I affix my signature in presence of two witnesses.

FERDINAND LAHM.

Witnesses:
EDWARD E. LONGAN,
JOHN C. HIGDON.